United States Patent [19]

Yamazaki et al.

[11] Patent Number: 5,493,453
[45] Date of Patent: Feb. 20, 1996

[54] APPARATUS FOR INSTALLING A CURVED MIRROR USED IN A SCANNING OPTICAL SYSTEM

[75] Inventors: Yoshihiro Yamazaki; Katsuhiro Yoshino, both of Tokyo, Japan

[73] Assignee: Asahi Kogaku Kogyo Kabushiki Kaisha, Tokyo, Japan

[21] Appl. No.: 288,799

[22] Filed: Aug. 12, 1994

[30] Foreign Application Priority Data

Aug. 13, 1993 [JP] Japan .................................. 5-201573

[51] Int. Cl.⁶ .............................. G02B 5/08; G02B 7/182
[52] U.S. Cl. .......................... 359/871; 359/872; 359/838; 359/869
[58] Field of Search ..................... 359/871, 864, 359/865, 869, 872, 873, 838, 881, 212, 217, 218, 222; 358/293

[56] References Cited

U.S. PATENT DOCUMENTS

| | | |
|---|---|---|
| 4,050,780 | 9/1977 | Wei et al. ................................. 359/212 |
| 5,301,060 | 4/1994 | Niikawa et al. ......................... 359/871 |

*Primary Examiner*—Paul M. Dzierzynski
*Assistant Examiner*—Mohammad Y. Sikder
*Attorney, Agent, or Firm*—Sandler, Greenblum, & Bernstein

[57] ABSTRACT

An apparatus for installing a curved mirror used in a scanning optical system is provided. The apparatus his a curved mirror assembly that includes a wall and a reference surface which is formed on a surface of said wall. The apparatus also has a stationary member with which the scanning optical system is provided and to which the curved mirror assembly is secured. The curved mirror assembly is secured to the stationary member by using the reference surface without the reflecting surface coming in contact with the stationary member.

11 Claims, 3 Drawing Sheets

APPARATUS FOR INSTALLING A CURVED MIRROR USED IN A SCANNING OPTICAL SYSTEM

BACKGROUND OF THE INVENTION

1. Field of the Invention

The present invention is directed to an apparatus for installing a curved mirror used in a scanning optical system.

2. Description of Related Art

Some conventional scanning optical systems such as a writing optical system (e.g., a laser beam printer or a laser facsimile) or a reading optical system (e.g., a image scanner) are provided with a curved mirror having a similar structure of a curved mirror 30 shown in FIG. 4. The curved mirror 30 has a curved reflecting surface 31.

The curved mirror 30 is normally made of a synthetic resin. For this reason, the curved mirror 30 tends to change its shape due to the variation of temperature and/or humidity, and/or an external force applied thereto upon being fixed to an optical system (not shown).

When the curved mirror 30 is fixed to an optical system, surfaces 32 located at both end portions of the reflecting surface 31 are used as reference surfaces for positioning the curved mirror 30 with respect to the optical system. Since only the surfaces 32 can be used reference surface for positioning, it is difficult for the curved mirror 30 to be fixed to the optical system in a stable manner. Besides, there are limited ways in which to fix the curved mirror 30 to an optical system.

Furthermore, due to the shape of the curved mirror 30 as shown in FIG. 4, there is a high probability that the person in charge of the installation of the curved mirror 30 may accidentally touches the reflecting surface 31, so that the reflecting surface 31 would be degraded or damaged.

SUMMARY OF THE INVENTION

The primary object of the present invention is to provide an apparatus for installing a curved mirror used in a scanning optical system that prevents the curved mirror from changing the shape, provides for a variety of installing methods for the curved mirror, and makes for easier installation and handling of the curved mirror thereof.

To achieve the object mentioned above, according to the present invention, an apparatus for installing a curved mirror used in a scanning optical system is provided having a curved mirror assembly that includes a wall and a reference surface which is formed on a surface of the wall, and a stationary member with which the scanning optical system is provided and to which the curved mirror assembly is secured. The curved mirror assembly is secured to the stationary member by using the reference surface without the reflecting surface coming in contact with the stationary member.

Preferably, the wall has at least one reference surface, and the stationary member has a contacting surface with which the reference surface comes into contact.

A positioning projection extending in a direction parallel to an optical axis of the reflecting surface may be formed on one of the reference surface and the contacting surface, and a positioning groove which holds the positioning projection when the reference surface comes into contact with the contacting surface may be formed on the other of the reference surface and the contact surface.

Moreover, the positioning projection may be formed at a position away from a center of the wall in a lengthwise direction of the wall.

The present disclosure relates to subject matter contained in Japanese Patent Application Ser. No. Hei 5-201573 (filed on Aug. 13, 1993) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENT

Figure 2:
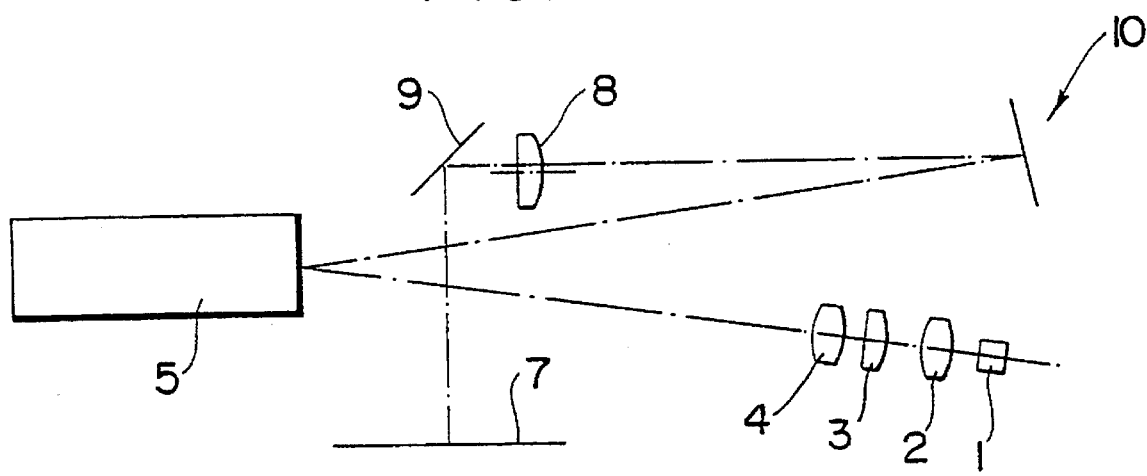
FIG. 2 is a schematic view of a reflection-type scanning optical systems to which the present invention is applied.
Figure 3:
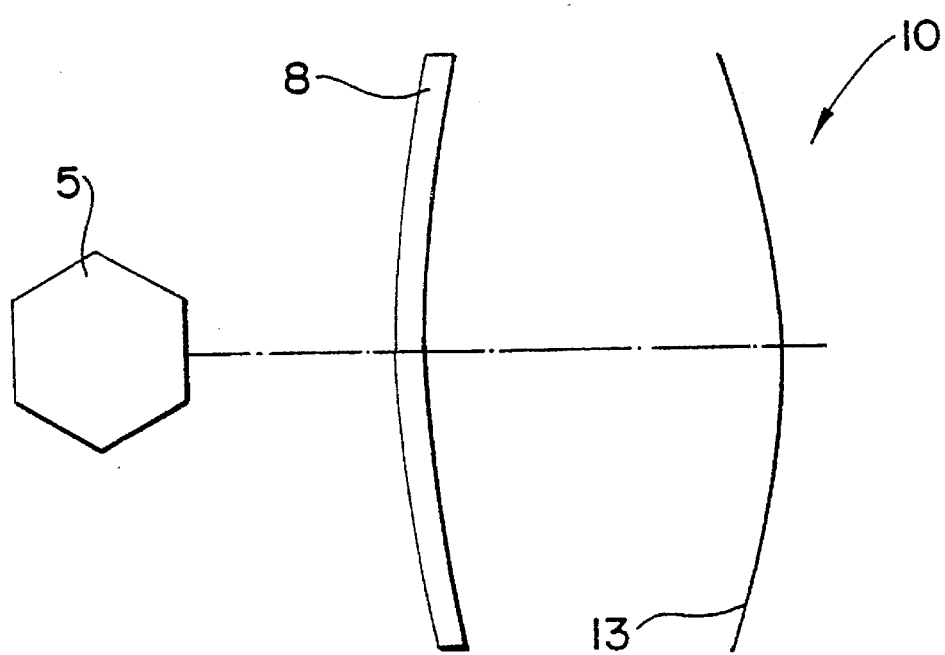
FIG. 3 is a schematic view of the polygon mirror, toric lens, and curved mirror of the reflecting-type scanning optical system shown in FIG. 2, seen on a plane including the sub-scanning direction of the optical system; and, FIG. 4 a schematic view of a conventional curved mirror.

FIG. 2 is a schematic view of a reflection-type scanning optical systems to which the present invention is applied. FIG. 3 is a schematic view of the polygon mirror, toric lens, and curved mirror of the reflecting-type scanning optical system shown in FIG. 2, seen on a plane including the sub-scanning direction of the optical system.

A laser beam emitted from a semi-conductor laser 1 is collimated by a collimating lens 2 and is made incident upon a cylindrical lens 3. The laser beam emitted from the cylindrical lens 3 is converged by a converging lens 4 and then reflected and scanned by a polygon mirror the main scanning direction. The converging lens 4 has a positive power both in the main scanning direction and in the sub-scanning direction, which is normal to the main scanning direction. The cylindrical lens 3 has a positive power only in the sub-scanning direction.

The laser beam reflected and scanned by the polygon mirror 5 is reflected by a curved mirror 10, which is a subject of the present invention, and then made incident upon a toric lens 8 provided as an anamorphic optical system. The laser beam emitted from the toric lens 8 is reflected by a plane mirror 9 and reaches to a scanned surface 7.

A reflecting surface 13 of the curved mirror 10 has the shape of a circular arc in a plane extending in the main scanning direction and a flat shape in a plane in the sub-scanning direction.

Figure 1:
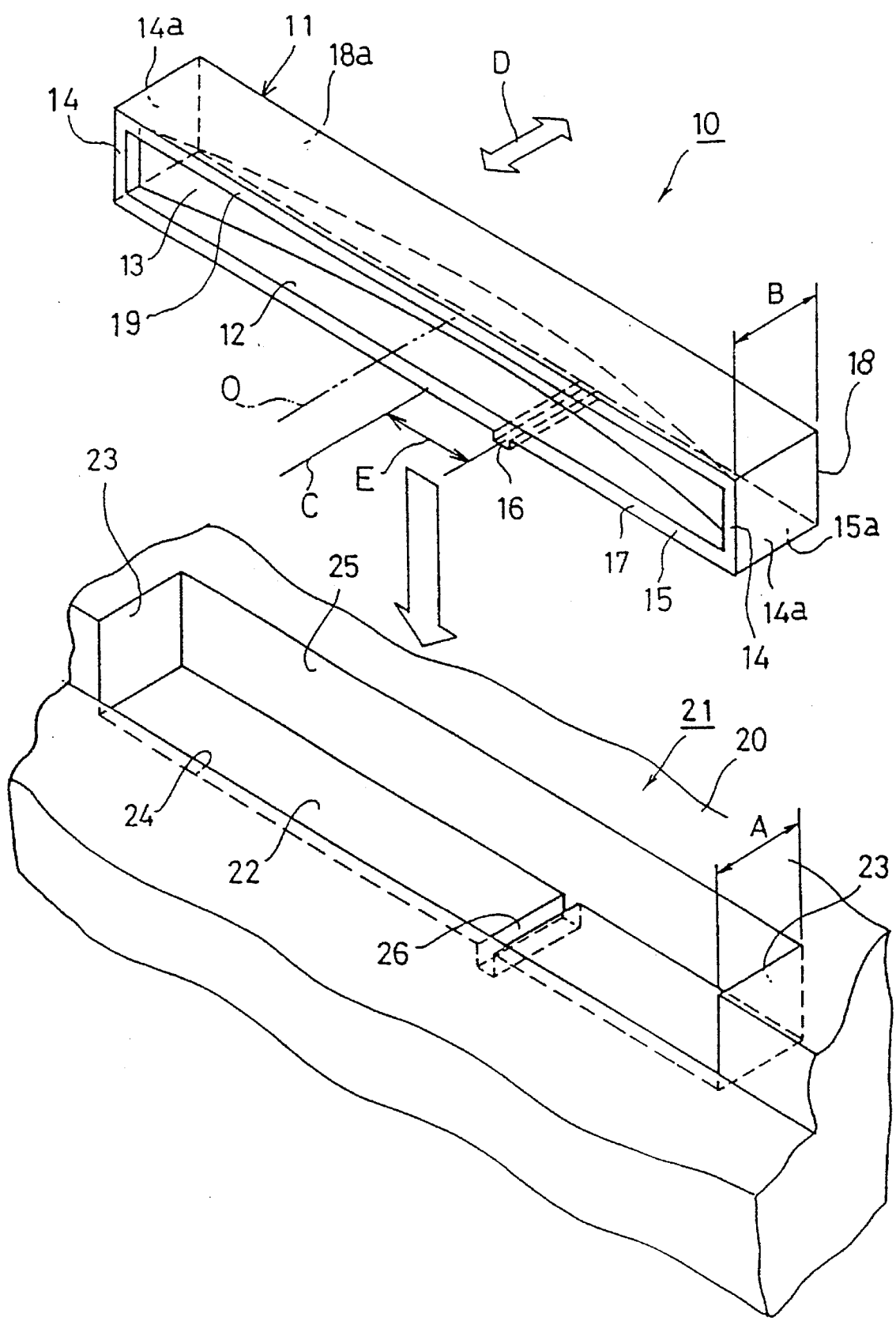
FIG. 1 is an isometric view of a curved mirror and a mounting groove formed on a stationary member of an optical system in which the curved mirror is to be installed, illustrating a state in which the curved mirror is being installed in the mounting groove, according to an embodiment of the present invention.

FIG. 1 shows a state in which the curved mirror (i.e., curved mirror assembly) 10 is being installed in the reflection-type scanning optical system. The curved mirror 10 is installed in a mounting groove 21 formed in a stationary member 20 of the reflection-type scanning optical system.

Figure 4:
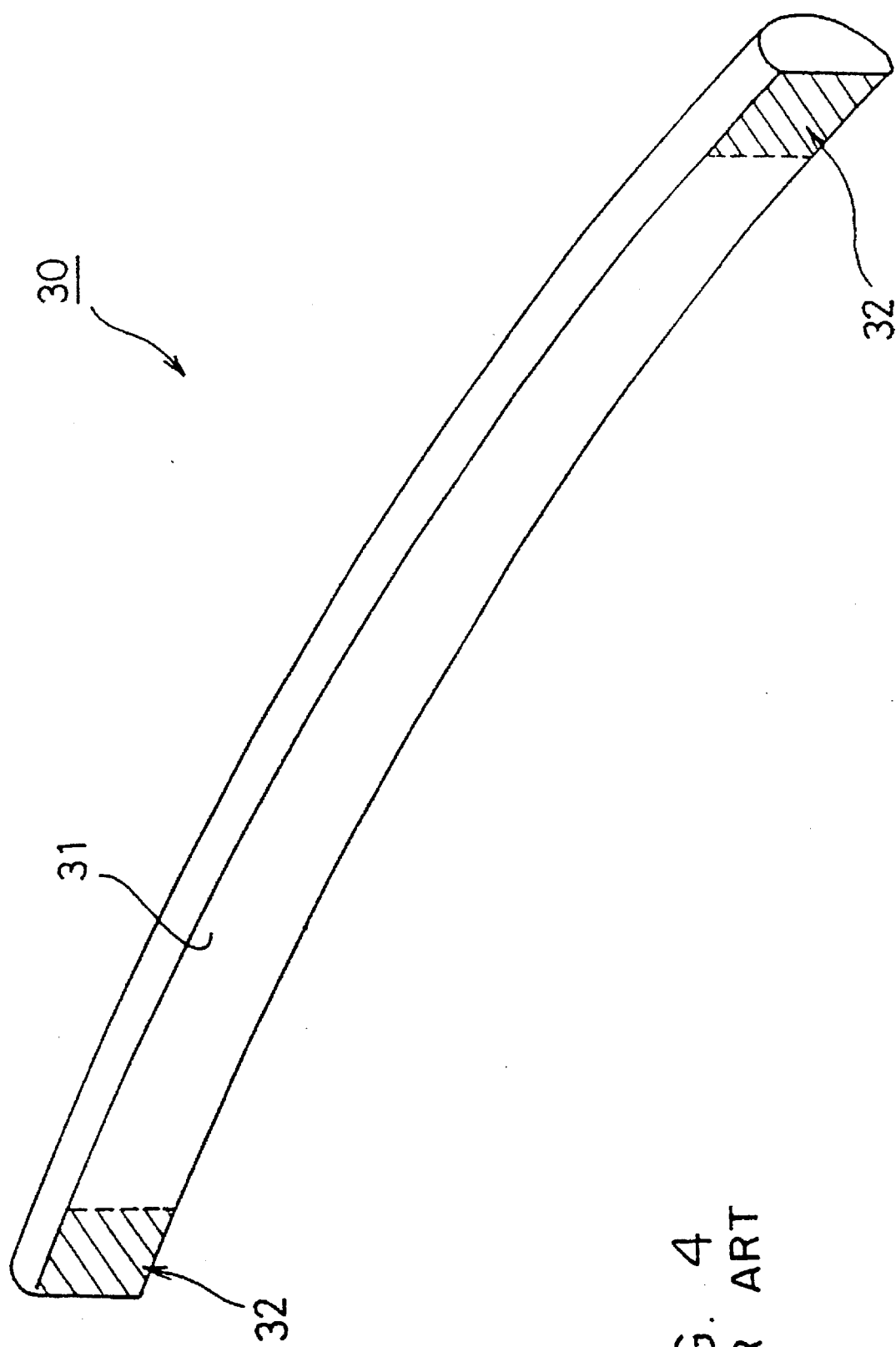

The curved mirror 10 is made of a synthetic resin as a unit and has an open box 11 comprising five walls, i.e., upper and lower walls 19 and 15, two side walls 14, and a rear wall 18. The open box 11 is substantially in the shape of a rectangular box. A rectangular-shaped opening 12 is formed on a front edge surface 17 extending in the lengthwise direction of the curved mirror 10. The reflecting surface 13 having a predetermined curvature is formed on one of the inside surfaces of the open box 11. The reflecting surface 13 corresponds to the reflecting surface 31 of the conventional curved mirror 30 a shown in FIG. 4. The reflecting surface 13 is made by metal plating the surface.

Both ends of the open box 11 are formed as end surfaces 14a which are perpendicular to the front edge surface 17 and also parallel to each other. A bottom surface of the open box 11 (i.e., an outer surface of the lower wall 15) is formed as a reference surface 15a which is perpendicular to both the front edge surface 17 and the end surfaces 14a. A rail portion (or positioning projection) 16 which extends in a direction parallel to an optical axis O is integral with the open box 11 on the reference surface 15a. The rail portion 16 has a predetermined height and is formed on the reference surface 15a at the position deviated from the center C of the reference surface 15a by a predetermined distance E. The optical axis O of the reflecting surface 13 refers to an axis which is normal to the reflecting surface 13 at the center thereof. The open box 11 also has a rear surface 18a of the rear wall 18 which is perpendicular to both the reference surface 15a and the end surfaces 14a and is parallel to the front edge surface 17.

The mounting (or position) groove 21 is formed in a manner such that the shape of the mounting groove 21 corresponds to the external shape of the curved mirror 10, so that the mounting groove 21 can properly hold the curved mirror 10. The mounting groove 21 has a flat bottom (or contacting) surface 22, end surfaces 23, a front surface 24, and a rear surface 25 which abut against the reference surface 15a, the end surfaces 14a, a lower portion of the front edge surface 17, and the rear surface 18a, respectively, when the curved mirror 10 is installed in the mounting groove 21. A guiding groove 26 is formed on the bottom surface 22 in a manner such that the guiding groove 26 slidably holds the rail portion 16 when the curved mirror 10 is in the mounting groove 21.

The length A of the mounting groove 21 is designed to be longer than the length B of the curved mirror 10 so that the curved mirror 10 can move in the mounting groove 21 in the direction of the optical axis O by a predetermined length. Likewise, the width of the bottom surface 22 (i.e., the width of the rear surface 25) is designed to be a little longer for clearance so that the curved mirror 10 may be installed and movable in the optical axis direction 0 in the mounting groove 21.

With the above mentioned structure, after the curved mirror 10 is installed in the mounting groove 21 with the reference surface 15a contacting the bottom surface 22, the curved mirror 10 can slidably be moved within a length of the length A minus the length B in the direction of the optical axis O, i.e., a direction D shown in FIG. 1, with the rail portion 16 in the guiding groove 26.

Accordingly, positioning the curved mirror 10 in the mounting groove 21 in a vertical direction of FIG. 1 is done by the reference surface 15a and the bottom surface 22. Positioning the curved mirror 10 in the mounting groove 21 in the lengthwise direction is done by the rail portion 16 and the guiding groove 26. Positioning the curved mirror 10 in the mounting groove 21 in the direction of the optical axis O is done by placing the curved mirror 10 in the mounting groove 21 at an optimum position by means of sliding the curved mirror 10 in the mounting groove 21 while the rail portion 16 slides in the guiding groove 26. After the curved mirror 10 is properly positioned in the mounting groove 21, the curved mirror 10 is fixed to the mounting groove 21 by applying for example an adhesive therebetween.

According to the installing apparatus of the present invention, since the unique arrangement is adopted in which the open box 11 is integral with the curved mirror 10 and the reference surface 15a of the open box 11 is fixed to the bottom surface 22 formed in the mounting groove 21 of the stationary member 20, the curved mirror 10 hardly changes its shape on account of the variation of temperature and/or humidity, and/or an external force applied thereto upon installation.

Moreover, since this unique arrangement is adopted in which the rail portion 16 extending in a direction parallel to the optical axis O is formed on the reference surface 15a of the curved mirror 10 and the guiding groove 26 which extends in a direction parallel to the optical axis O and is able to engage with the rail portion 16 is formed on the bottom surface 22 of the mounting groove 21, the curved mirror 10 can properly be positioned in the lengthwise direction thereby simplifying the installation of the curved mirror 10 in the mounting groove 21.

In the above embodiment, regarding the positioning of the curved mirror 10 in the direction of the optical axis O, the curved mirror 10 is first slid in the optical axis direction O with the rail portion 16 sliding in the guiding groove 26 to place the curved mirror 10 at an optimum position, and thereafter the curved mirror 10 is fixed to the mounting groove 21 by means of an adhesive or the like. In addition to this arrangement, if the relative positional relationship among the reflecting surface 13, the front edge surface 17, and the front surface 24 is precisely defined, the curved mirror 10 can easily be placed at an optimum position in the optical axis direction O simply by bringing the front edge surface 17 into contact with the front surface 24.

Furthermore, in the above embodiment, since the rail portion 16 is formed on the reference surface 15a at a position away from the center C of the reference surface 15a by the predetermined distance E, not at the center C of the reference surface 15a, accidental installation of the curved mirror 10 in the mounting groove 21 in the wrong way in which the reflecting surface 13 faces the rear surface 25 can be prevented.

The shape of the frame portion of the curved mirror is not limited only to the shape of the open box 11 but could be a different shape as long as the mounting groove has a shape corresponding to an outer shape of the open box of the curved mirror. For this reason, according to present invention, it can be expected to have a variety of ways of installing the curved mirror.

Furthermore, according to the installing apparatus of the present invention, the person who installs a curved mirror in an optical system can handle the curved mirror by holding the open box of the curved mirror by, e.g., fingers, when the curved mirror is to be installed, the possibility of touching the reflecting surface of the curved mirror upon installation is much reduced as compared with a conventional curved mirror, thus he can handle the curved mirror much more easily than a conventional curved mirror.

Although, in the above embodiment, the bottom surface 15a of the open box 11 is formed as a reference surface, another surface of the open box 11 may be formed as a reference surface having a rail portion similar to the rail portion 16. In this case, a guiding groove similar to the guiding groove 26 is formed on the surface of the mounting groove 21 which is brought into contact with the above-mentioned surface.

Furthermore, in the above embodiment, the guiding groove 26 may be formed on the reference surface 15a of the curved mirror 10 and the rail portion 16 may be formed on the bottom surface 22 of the mounting groove 21.

Although the present invention is applied to the reflecting-type scanning optical system shown in FIG. 2 in the above embodiment, the present invention may of course be applied to other types of scanning optical systems.

Although the invention has been described with reference to particular means, materials and embodiments, it is to be understood that the invention is not limited to the particulars disclosed and extends to all equivalents within the scope of the claims.

We claim:

1. An apparatus for installing a curved mirror used in a scanning optical system, comprising:

a curved mirror assembly comprising a wall and a reference surface formed on a surface of said wall; and a stationary member with which said scanning optical system is provided and to which said curved mirror assembly is secured, said curved mirror assembly being secured to said stationary member by using said reference surface without said reflecting surface coming in contact with said stationary member;

said wall comprising at least one reference surface, and said stationary member comprising a contacting surface with which said reference surface comes into contact;

a positioning projection extending in a direction parallel to an optical axis of said reflecting surface being formed on one of said reference surface and said contacting surface; and a positioning groove, for holding said positioning projection when said reference surface comes into contact with said contacting surface, being formed on the other of said reference surface and said contacting surface.

2. The installing apparatus of claim 1, wherein said positioning projection is formed at a position away from a center of said wall in a lengthwise direction of said wall.

3. An apparatus for installing a curved mirror used in a scanning optical system, comprising:

a curved mirror assembly comprising a wall and a reference surface formed on a surface of said wall; and a stationary member with which said scanning optical system is provided and to which said curved mirror assembly is secured, said curved mirror assembly being secured to said stationary member by using said reference surface without said reflecting surface coming in contact with said stationary member;

said wall comprising at least one reference surface, and said stationary member comprising a contacting surface with which said reference surface comes into contact;

said stationary member comprising a mounting groove for fixing said wall, said mounting groove having a shape corresponding to an external shape of said wall, a surface in said mounting groove being formed as said contacting surface.

4. The installing apparatus of claim 3, wherein said wall is substantially in the shape of a rectangular box.

5. The installing apparatus of claim 3, wherein a positioning projection extending in a direction parallel to an optical axis of said reflecting surface is formed on one of said reference surface and said contacting surface, and a positioning groove which holds said positioning projection when said reference- surface comes into contact with said contacting surface is formed on the other of said reference surface and said contacting surface.

6. The installing apparatus of claim 3, wherein said mounting groove is formed in a manner such that a length of said mounting groove is longer than a length of said wall in said optical axis direction by a predetermined length, whereby said wall can move in said mounting groove in said optical axis direction within a range of said predetermined length.

7. The installing apparatus of claim 6, wherein positioning projection is formed at a position away from a center of said wall in a lengthwise direction of said wall.

8. The installing apparatus of claim 1, said positioning groove slidably holding said positioning projection.

9. The installing apparatus of claim 5, said wall being in slidable engagement with said stationary member.

10. The installing apparatus of claim 5, said external shape of said wall defining a positioning projection.

11. The installing apparatus of claim 14, further comprising a positioning groove slidably holding said positioning projection.

\* \* \* \* \*

UNITED STATES PATENT AND TRADEMARK OFFICE
CERTIFICATE OF CORRECTION

PATENT NO. : 5,493,453
DATED : February 20, 1996
INVENTOR(S) : Y. YAMAZAKI et al.

It is certified that error appears in the above-indentified patent and that said Letters Patent is hereby corrected as shown below:

At column 6, line 23 (claim 5, line 6), change "reference-" to ---reference---.

At column 6, line 30 (claim 6, line 5), change "whereby" to ---such that---.

At column 6, line 33 (claim 7, line 1), after "wherein" insert ---said---.

At column 6, line 38 (claim 9, line 1), change "5," to ---3,---.

At column 6, line 40 (claim 10, line 1), change "5," to ---3,---.

At column 6, line 42 (claim 11, line 1), change "14," to ---10,---.

Signed and Sealed this

Fifteenth Day of October, 1996

Attest:

BRUCE LEHMAN

Attesting Officer    Commissioner of Patents and Trademarks